| (12) United States Patent<br>Benkreira et al. | (10) Patent No.: US 11,263,674 B2<br>(45) Date of Patent: Mar. 1, 2022 |
|---|---|

(54) SETTING UP A PAYMENT PLAN TO PAY A BILL

(71) Applicant: Capital One Services, LLC, McLean, VA (US)

(72) Inventors: Abdelkadar M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 24 days.

(21) Appl. No.: 16/536,400

(22) Filed: Aug. 9, 2019

(65) Prior Publication Data

US 2020/0082444 A1 Mar. 12, 2020

Related U.S. Application Data

(63) Continuation of application No. 16/123,791, filed on Sep. 6, 2018, now Pat. No. 10,380,659.

(51) Int. Cl.
| G06Q 40/00 | (2012.01) |
| G06Q 30/04 | (2012.01) |
| G06Q 20/14 | (2012.01) |
| G06Q 40/02 | (2012.01) |
| G06Q 20/40 | (2012.01) |
| G06Q 20/10 | (2012.01) |

(52) U.S. Cl.
CPC ........... *G06Q 30/04* (2013.01); *G06Q 20/102* (2013.01); *G06Q 20/14* (2013.01); *G06Q 20/405* (2013.01); *G06Q 40/02* (2013.01)

(58) Field of Classification Search
None
See application file for complete search history.

(56) References Cited

U.S. PATENT DOCUMENTS

| 6,067,522 A | 5/2000 | Warady et al. |
| 6,411,938 B1 | 6/2002 | Gates et al. |
| 7,653,591 B1 | 1/2010 | Dabney et al. |
| 8,191,777 B2 | 6/2012 | Davila et al. |

(Continued)

OTHER PUBLICATIONS https://ip.com/IPCOM/000247450.*

(Continued)

*Primary Examiner* — Talia F Crawley
(74) *Attorney, Agent, or Firm* — Harrity & Harrity, LLP

(57) ABSTRACT

A device may receive, from a user device, an input that indicates a request to set up a payment plan associated with a bill. The device may send to the user device an instruction for a user to send access information that permits access to a system associated with an employment account of the user. The device may receive from the user device the access information and obtain data related to future earnings of the user from the system using the access information. The device may process the data to identify an earnings amount and an earnings date. The device may determine, based on the earnings amount and the earnings date, the payment plan, wherein the payment plan indicates a payment amount and a payment date, and cause a payment account associated with the user to pay the bill according to the payment plan.

20 Claims, 9 Drawing Sheets

(56) References Cited

U.S. PATENT DOCUMENTS

| | | | | |
|---|---|---|---|---|
| 8,788,389 | B1* | 7/2014 | Fernandes | G06Q 20/382 |
| | | | | 705/35 |
| 9,760,871 | B1* | 9/2017 | Pourfallah | G06Q 20/401 |
| 9,934,494 | B1 | 4/2018 | Nolte et al. | |
| 10,115,087 | B2* | 10/2018 | Pourfallah | G06Q 20/3223 |
| 10,380,659 | B1* | 8/2019 | Benkreira | G06Q 20/102 |
| 2003/0233278 | A1 | 12/2003 | Marshall et al. | |
| 2004/0111370 | A1* | 6/2004 | Saylors | G06Q 20/102 |
| | | | | 705/40 |
| 2005/0211765 | A1 | 9/2005 | Brown et al. | |
| 2006/0122932 | A1 | 6/2006 | Birtwell et al. | |
| 2006/0212393 | A1 | 9/2006 | Lindsay et al. | |
| 2007/0011025 | A1* | 1/2007 | Cracchiolo | G06Q 40/08 |
| | | | | 705/2 |
| 2007/0011088 | A1* | 1/2007 | Cracchiolo | G06Q 50/22 |
| | | | | 705/39 |
| 2008/0275779 | A1 | 11/2008 | Lakshminarayanan et al. | |
| 2009/0089193 | A1 | 4/2009 | Paintin et al. | |
| 2010/0145856 | A1* | 6/2010 | Kardokas | G06Q 20/40 |
| | | | | 705/44 |
| 2010/0145857 | A1 | 6/2010 | Davila et al. | |
| 2010/0223160 | A1 | 9/2010 | Brown et al. | |
| 2010/0274687 | A1 | 10/2010 | Ghosh et al. | |
| 2012/0136780 | A1* | 5/2012 | El-Awady | G06Q 20/14 |
| | | | | 705/40 |
| 2012/0197800 | A1 | 8/2012 | Ross et al. | |
| 2012/0329424 | A1 | 12/2012 | Gudlavenkatasiva et al. | |
| 2012/0329425 | A1 | 12/2012 | Velusamy et al. | |
| 2013/0041810 | A1* | 2/2013 | Murrell | G06Q 10/105 |
| | | | | 705/39 |
| 2013/0096935 | A1* | 4/2013 | Saidel | G06Q 40/06 |
| | | | | 705/2 |
| 2013/0103580 | A1* | 4/2013 | Ventura | G06Q 20/102 |
| | | | | 705/40 |
| 2013/0346302 | A1* | 12/2013 | Purves | G06Q 20/108 |
| | | | | 705/40 |
| 2014/0180919 | A1* | 6/2014 | Brown | G06Q 20/12 |
| | | | | 705/42 |
| 2014/0279459 | A1 | 9/2014 | Weiss et al. | |
| 2014/0279700 | A1* | 9/2014 | Cook | G06Q 10/1057 |
| | | | | 705/36 R |
| 2015/0073952 | A1* | 3/2015 | Ventura | G06Q 40/12 |
| | | | | 705/30 |
| 2015/0324770 | A1* | 11/2015 | Starikova | G06Q 20/10 |
| | | | | 705/40 |
| 2015/0324906 | A1* | 11/2015 | Starikova | G06Q 40/02 |
| | | | | 705/38 |
| 2016/0026981 | A1 | 1/2016 | Collins et al. | |
| 2016/0086261 | A1* | 3/2016 | Shah | G06Q 10/105 |
| | | | | 705/38 |
| 2016/0163001 | A1* | 6/2016 | Murrell | G06Q 10/105 |
| | | | | 705/39 |
| 2016/0371661 | A1* | 12/2016 | Shah | G06Q 20/401 |
| 2017/0004550 | A1 | 1/2017 | Shaaban et al. | |
| 2018/0025334 | A1* | 1/2018 | Pourfallah | G06Q 20/401 |
| | | | | 705/4 |
| 2019/0251564 | A1* | 8/2019 | Shah | G06Q 40/025 |
| 2019/0340592 | A1* | 11/2019 | Dennison | G06Q 20/102 |
| 2020/0082444 | A1* | 3/2020 | Benkreira | G06Q 20/14 |

OTHER PUBLICATIONS https://ip.com/IPCOM/000177033.*

Bernard T.S.,"Program Links Loans to future Earnings," Jul. 19, 2013, 5 pages. Retrieved from Internet:[URL:https://www.nytimes.com/2013/07/20/your-monry/unusaual-student-loadn-programs-link-to-future-earnings.html].

FuturePay Inc., "How FuturePay Works," Sep. 6, 2018 (print date), 4 pages. Retrieved from Internet:[URL: https://futurepay.com/].

Kwun., "The Way You Pay Bills Is about to Change Forever," Oct. 24, 2017, 22 pages. Retrieved from Internet:[URL:https://www.fastcompnay.com/90147673/the-way-you-pay-bills-is-about-to-change-forever].

* cited by examiner

SETTING UP A PAYMENT PLAN TO PAY A BILL

RELATED APPLICATION

This application is a continuation of U.S. patent application Ser. No. 16/123,791, filed Sep. 6, 2018 (now U.S. Pat. No. 10,380,659), which is incorporated herein by reference.

BACKGROUND

An individual may need to set up a payment plan to pay a bill. The payment plan may specify a payment amount, a payment date, and/or additional factors relevant to paying the bill. The individual may pay a fee to set up the payment plan.

SUMMARY

According to some possible implementations, a device may comprise one or more memory devices and one or more processors, operatively coupled to the one or more memory devices, to receive, from a user device, an input that indicates a request to set up a payment plan associated with a bill. The one or more processors may send, to the user device and based on receiving the input, an instruction for a user to send access information that permits access to a system associated with an employment account of the user. The one or more processors may receive, from the user device and based on sending the instruction, the access information, and obtain data related to future earnings of the user from the system using the access information. The one or more processors may process the data to identify an earnings amount and an earnings date, wherein the earnings amount is associated with an amount owed to the user and the earnings date is associated with a date on which the earnings amount will be available to the user. The one or more processors may determine, based on the earnings amount and the earnings date, the payment plan, wherein the payment plan indicates a payment amount and a payment date, and cause a payment account associated with the user to pay the bill according to the payment plan.

According to some possible implementations, a non-transitory computer-readable medium may store instructions that comprise one or more instructions that, when executed by one or more processors, may cause the one or more processors to receive, from a user device, an input that indicates a request to set up a payment plan associated with a bill. The one or more instructions, when executed by the one or more processors, may cause the one or more processors to send, to the user device and based on receiving the input, a notification for a user to enable a system associated with an employment account of the user to send access information, and receive, from the system and based on sending the notification, the access information. The one or more instructions, when executed by the one or more processors, may cause the one or more processors to obtain data related to future earnings of the user from the system using the access information and process the data to identify an earnings amount and an earnings date, wherein the earnings amount is associated with an amount owed to the user and the earnings date is associated with a date on which the earnings amount will be available to the user. The one or more instructions, when executed by the one or more processors, may cause the one or more processors to determine, based on the earnings amount and the earnings date, the payment plan, wherein the payment plan indicates a payment amount and a payment date, and cause a payment account associated with the user to pay the bill according to the payment plan.

According to some possible implementations, a method may include receiving, by a device, an input that indicates a request to set up a payment plan associated with a bill. The method may include sending, by the device and to a user device, an instruction for a user to send access information that permits access to electronic messages associated with an electronic messaging account of the user, and receiving, by the device, from the user device, and based on sending the instruction, the access information. The method may include determining, by the device, data related to future earnings of the user from the electronic messages associated with the electronic messaging account after receiving the access information, and processing, by the device, the data to identify an earnings amount and an earnings date, wherein the earnings amount is associated with an amount owed to the user and the earnings date is associated with a date on which the earnings amount will be available to the user. The method may include determining, by the device, based on the earnings amount and the earnings date, the payment plan, wherein, the payment plan indicates a payment amount and a payment date, and causing, by the device, a payment account associated with the user to pay the bill according to the payment plan.

DETAILED DESCRIPTION

Figure 1A:
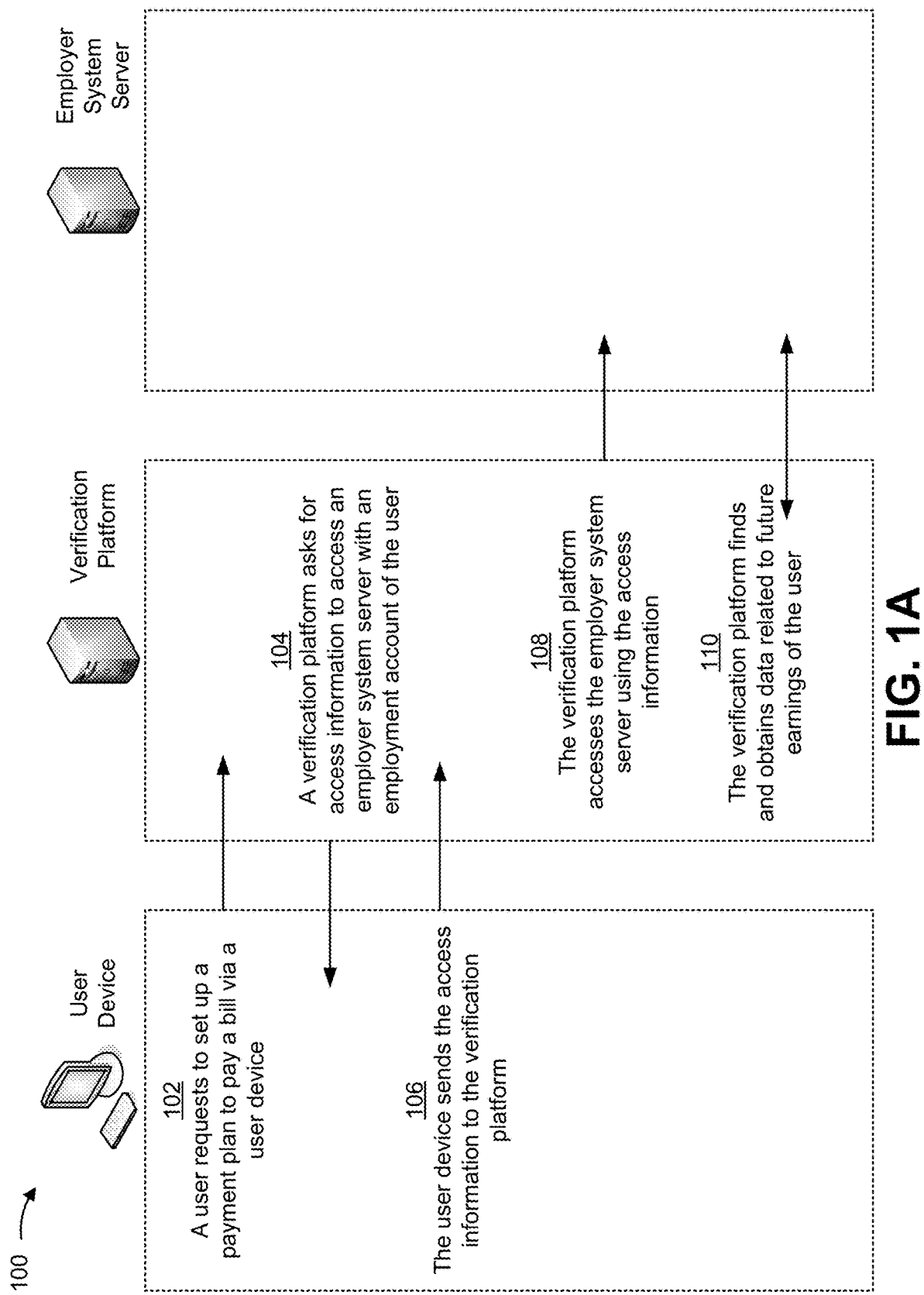
FIGS. 1A-1D are diagrams of an example implementation described herein.

The following detailed description of example implementations refers to the accompanying drawings. The same reference numbers in different drawings may identify the same or similar elements.

Many people are employed in professions that are commissions-based, where earnings are paid out to an employee on an inconsistent schedule. Due to the sporadic nature of when the employee will receive his earnings, the employee may have difficulty paying bills that are due on a regular basis (e.g., a credit card bill due on a monthly basis). Given the rise in popularity of a gig-based economy, these types of issues, where employees have inconsistent earnings but still need to pay bills on a regular basis, will only continue to become more prevalent.

Some implementations, described herein, provide a verification platform that is capable of determining a payment plan for paying a bill. In some implementations, the verification platform may determine the payment plan based on future earnings of the user. For example, the payment plan may specify a payment amount that is due when the user expects to have access to the future earnings, which may be after the bill is due. In some implementations, the verification platform is able to access an employer system server to verify the future earnings due to the user by an employer. In some implementations, the verification platform is able to access an electronic messaging server to verify the future earnings due to the user by the employer. In some implementations, the verification platform may cause a payment account associated with the user to pay the bill according to the payment plan. In some implementations, the verification platform may cause a lock to be placed on the payment account until the bill is paid.

In this way, the verification platform can assist with setting up a payment plan for paying a bill with future earnings in a way that does not require cumbersome human interaction to determine the parameters of the payment plan. This conserves processing resources and/or computing resources that would otherwise be consumed when an individual inefficiently searches for and/or enters future earnings information to determine the payment plan. In addition, the verification platform can create payment plans related to hundreds, thousands, or more bills of numerous users in a centralized, organized, and easily accessible manner. This conserves processing resources and/or computing resources that would otherwise be used to send late notices, track payments of late fees, notify credit bureaus of late payments, and/or the like. Moreover, this increases the use of payment plans by users, thereby resulting in fewer late fees to users who would otherwise pay the bill after the bill's due date. Additionally, this decreases the amount of delinquent and/or unpaid bills, which results in more consistent revenue for bill collectors.

FIGS. 1A-1D are diagrams of an example implementation 100 described herein. As shown in FIGS. 1A-1D, example implementation 100 may include a user device, a verification platform, an employer system server, an electronic messaging server, and a banking server.

The user device may be a communication and/or computing device, such as a mobile phone, a smartphone, a laptop computer, a tablet computer, a wearable communication device (e.g., a pair of smart eyeglasses, a smart wristwatch, etc.), and/or the like. In some implementations, a user may be able to send a request, via the user device, to a verification platform to perform an action, such as set up a payment plan to pay a bill. In some implementations, the bill may be related to services or items (e.g., a credit card bill, a mortgage payment bill, a loan payment bill, and/or the like) provided by a service provider (e.g., a bank, a retail store, a loan provider, and/or the like).

The verification platform may be a computing device, a server, a cloud computing device, and/or the like. In some implementations, the verification platform may perform an action, such as setup a financial plan, determine the payment plan, and/or the like. In some implementations, the verification platform may cause the bill to be paid. In some implementations, the verification platform may cause the bill to be paid according to the payment plan.

The employer system server may be associated with an employment account of the user. The employment account of the user may include data related to future earnings of the user. The electronic messaging server may be associated with an electronic messaging account of the user. The electronic messaging account of the user may include the data related to future earnings of the user, data related to future payments to the user, data related to future reimbursements to the user, data related to future money transfers to the user, and/or the like. The banking server may be associated with a payment account associated with the user. The payment account associated with the user may be used to pay the bill according to the payment plan.

For FIGS. 1A-1D, assume that a user has a bill that indicates a due amount and a due date and the user wants to pay the bill with the future earnings of the user. The user may request that the verification platform assist in setting up the payment plan to pay the bill. The description accompanying FIG. 1A describes a first scenario where the verification platform may access the employment account of the user on the employer system server using access information supplied by the user to obtain the data related to future earnings of the user. The description accompanying FIG. 1B describes a second scenario where the verification platform may access the employment account of the user on the employer system server using access information supplied by the employer system server to obtain the data related to future earnings of the user. The description accompanying FIG. 1C describes a third scenario where the verification platform may access the electronic messaging account of the user using access information supplied by the user to determine the data related to future earnings of the user. The description accompanying FIG. 1D describes how the verification platform, in each of the three scenarios, may then process the data related to the future earnings of the user, determine the payment plan, and cause the bill to be paid according to the payment plan.

Figure 1B:
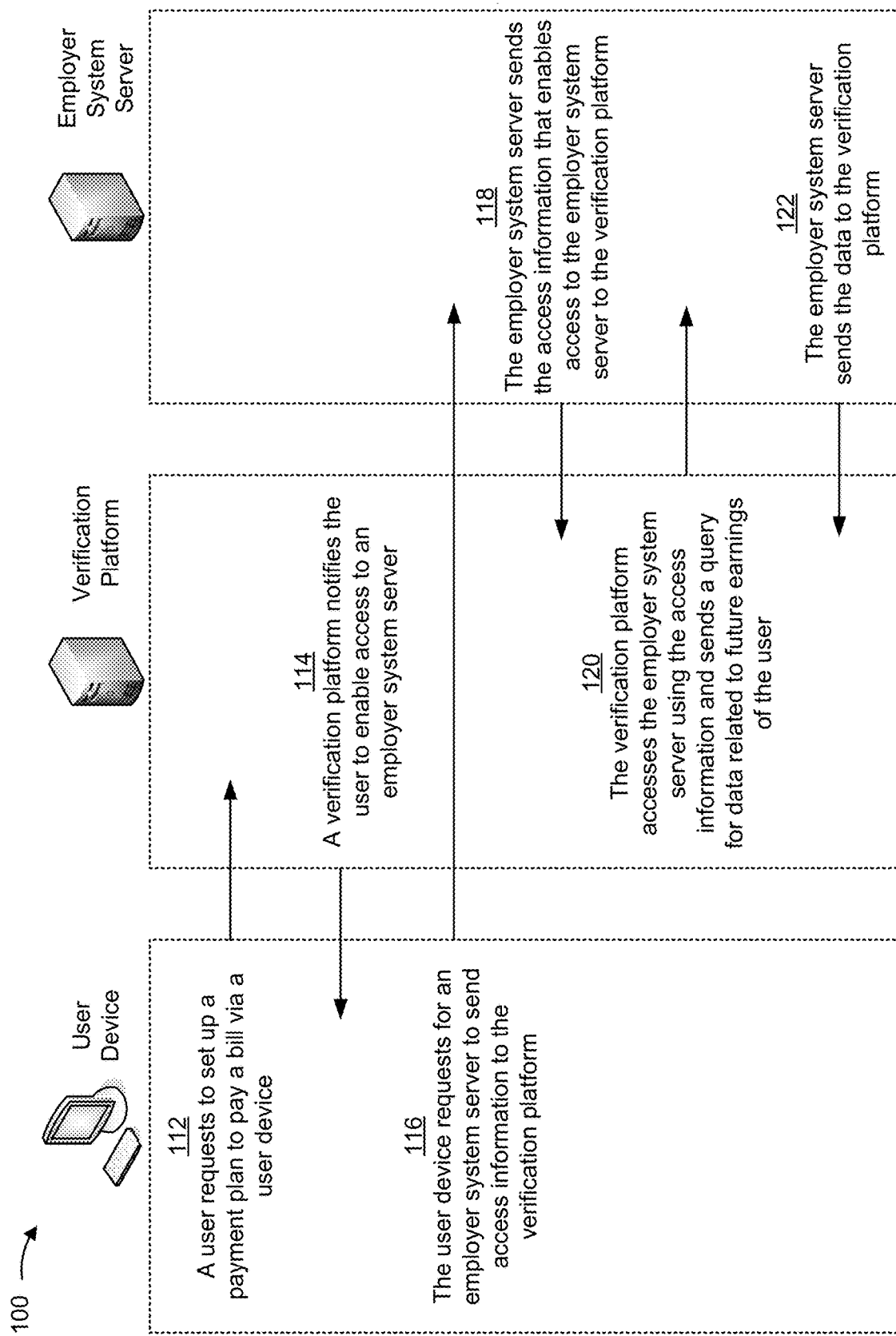
Figure 1C:
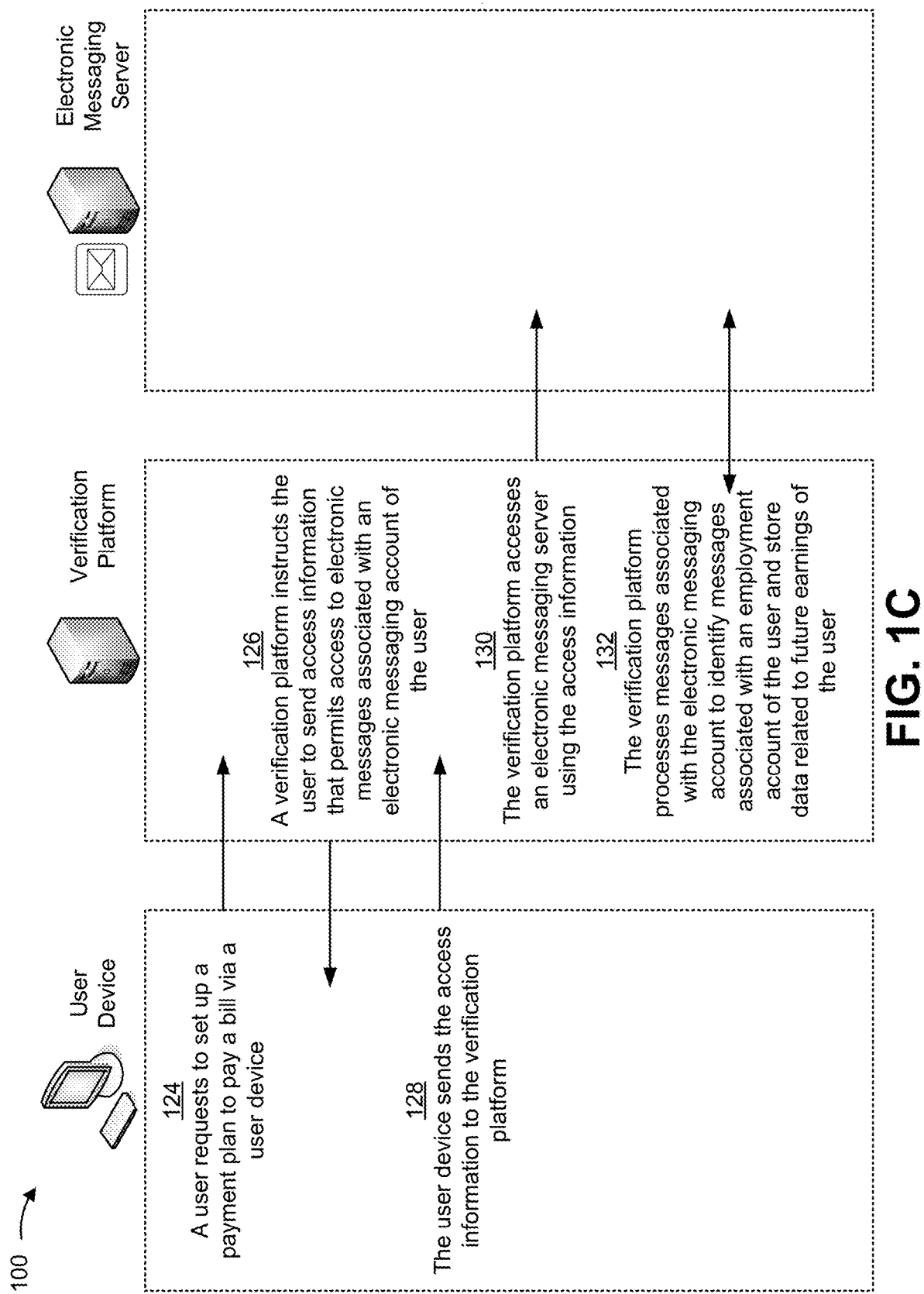

While three separate scenarios are described with regard to FIGS. 1A-1C, one or more aspects of these scenarios may be used together to form a hybrid scenario of FIGS. 1A, 1B, and/or 1C.

In the first scenario, as shown in FIG. 1A, and by reference number 102, the user may send, via the user device and to the verification platform, a request to set up the payment plan to pay the bill. For example, the user may open an application on the user device and enter an input that indicates a request to create the payment plan to pay the bill using the future earnings of the user. The user device may then send the input to the verification platform. In some implementations, the verification platform may receive, from the user device, the input that indicates the request to set up the payment plan associated with the bill.

As shown by reference number 104, the verification platform may send to the user device an instruction for the user to send access information that permits access to the employer system server (e.g., a system associated with an employment account of the user). For example, the verification platform may send an instruction, which may ask for the user's security credentials to access the employer system server, to the user device, such that the instruction is displayed on the user device (e.g., by providing a prompt for display via a display associated with the user device, by causing a user interface to be provided for display via the display, and/or the like). In some implementations, the verification platform may send the instruction to the user device based on receiving the input from the user device.

As shown by reference number 106, the user device may send the access information to the verification platform. In some implementations, the access information may include a set of credentials associated with the employment account, a username/password combination, a security token (e.g., that provides limited access to the employer system server), and/or the like. For example, the user device may send, to the verification platform, the username/password combination that the verification platform can use to gain access to the employment account on the employer system server. In some implementations, the verification platform may receive the access information from the user device based on the verification platform sending the instruction to the user device.

As shown by reference number 108, the verification platform may access the employer system server using the access information. For example, the verification platform may access the employer system server using the username/password combination. As shown by reference number 110, the verification platform may find and obtain the data related to future earnings of the user on the employer system server. In some implementations, the data related to future earnings of the user is stored in the employment account of the user on the employer system server. In some implementations, the verification platform may navigate to where the data related to future earnings of the user is stored in the employer system server and obtain the data from the employer system server. For example, the verification platform may perform a lookup on the user's future earnings to obtain the data related to future earnings of the user.

In some implementations, the verification platform may be configured to communicate with the employer system server via automated web-based interactions (e.g., web scraping), where one or more scripts may be created and utilized to automatically visit the employer system server's website, input the access information to log into the user's employment account, click various buttons and/or links on the website, and/or the like, to obtain the data related to future earnings of the user.

The verification platform may then perform additional steps to process the data related to future earnings of the user, determine the payment plan, and cause the bill to be paid according to the payment plan, as described below in connection with FIG. 1D.

In the second scenario, as shown in FIG. 1B, and by reference number 112, the user may send, via the user device, a request to set up the payment plan to pay the bill to the verification platform, in a similar manner to that described elsewhere herein (see, e.g., the description accompanying FIG. 1A). As shown by reference number 114, the verification platform may send, to the user device, a notification for the user to enable the employer system server (e.g., the system) associated with the employment account of the user to send access information. For example, the verification platform may send the notification, which may state that the user needs to log into the employment account on the employer system server and ask the employer system server to grant access to the verification platform, to the user device, such that that the notification is displayed on the user device (e.g., by providing a prompt for display via the display associated with the user device, by causing a user interface to be provided for display via the display, and/or the like). In some implementations, the verification platform may send the notification to the user device based on receiving the input from the user device.

As shown by reference number 116, the user device may send a command to the employer system server to send the access information to the verification platform. For example, the user device may send the command to the employer system server to send the access information, such as the set of credentials associated with the employment account, the username/password combination, the security token (e.g., that provides limited access to the employer system server), and/or the like. As shown by reference number 118, the employer system server may send the access information that enables access to the employer system server to the verification platform. In some implementations, the verification platform may receive the access information from the employer system server based on sending the notification.

As shown by reference number 120, in some implementations, the verification platform may access the employer system server using the access information. For example, the verification platform may use a security token (e.g., an open authentication (OAuth)-based token provided by the employer system server) to access the employer system server. In some implementations, the verification platform may send a query to the employer system server for the data related to future earnings of the user. For example, the verification platform may send a query to the employer system server for information included in the employment account of the user that concerns the user's next earnings payment. As shown by reference number 122, the employer system server, based on the verification platform's query, may find (e.g., by performing a lookup) and send the data related to future earnings of the user to the verification platform. In some implementations, the verification platform may receive the data related to future earnings of the user from the employer system server based on sending the query.

In some implementations, the verification platform may establish a connection with the employer system server via an application programming interface (API) and request, via the connection, delivery of the data from the employer system server. For example, the verification platform may make an API call, using the security token, to establish a connection with the employer system server, and send a request, via the connection, for delivery of information concerning the user's earnings as of a future date. In some implementations, the employer system server, based on the verification platform's request, may find (e.g., by performing a lookup) and send, via the connection, the data related to future earnings of the user to the verification platform. In some implementations, the verification platform may be configured to communicate with the employer system server via automated web-based interactions (e.g., web scraping), in a similar manner as that described elsewhere herein (see, e.g., the description accompanying FIG. 1A), to obtain the data related to future earnings of the user.

The verification platform may then perform additional steps to process the data, determine the payment plan, and cause the bill to be paid according to the payment plan, as described below in connection with FIG. 1D.

In the third scenario, as shown in FIG. 1C, and by reference number 124, the user may send, via the user device, a request to set up the payment plan to pay the bill to the verification platform, in a similar manner to that described elsewhere herein (see, e.g., the description accompanying FIG. 1A). As shown by reference number 126, the verification platform may send, to the user device, an instruction for a user to send access information that permits access to electronic messages associated with an electronic messaging account of the user. For example, the verification platform may send the instruction, which may state that the user needs to send login information to access the electronic messaging account associated with the electronic messaging server, to the user device, such that that the notification is displayed on the user device (e.g., by providing a prompt for display via the display associated with the user device, by causing a user interface to be provided for display via the display, and/or the like).

As shown by reference number 128, the user device may send the access information to the verification platform. In some implementations, the access information may include a set of credentials associated with the electronic messaging account, a username/password combination, a security token (e.g., that provides limited access to the electronic messaging server), and/or the like. For example, the user device may send the username/password combination that permits access to the electronic messaging account on the electronic messaging server. In some implementations, the verification platform may receive the access information from the user device based on sending the instruction to the user device.

In some implementations, the user device may send a command to the electronic messaging server to send the access information to the verification platform. For example, the user device may send the command to the electronic messaging server to send the security token associated with the electronic messaging account to the verification platform. In some implementations, the electronic messaging server may send the access information that enables access to the electronic messaging server to the verification platform. In some implementations, the verification platform may receive the access information from the electronic messaging server based on sending the instruction.

As shown by reference number 130, the verification platform may access the electronic messaging account of the electronic messaging server using the access information. For example, the verification platform may access the electronic messaging account of the electronic messaging server using the username/password combination.

As shown by reference number 132, the verification platform may process the electronic messages associated with the electronic messaging account to identify one or more electronic messages associated with an employment account of the user. For example, the verification platform may process the electronic messages to identify electronic messages sent by an employer of the user. In some implementations, the verification platform may process hundreds, thousands, or more electronic messages in hundreds, thousands, or more electronic messaging accounts. In this way, the verification platform may process a set of electronic messages that cannot be processed manually or objectively (e.g., in a consistent manner) by a human actor. Additionally, or alternatively, the verification platform may process the electronic messages associated with the electronic messaging account to identify one or more electronic messages associated with a plurality of employment accounts of the user.

In some implementations, the verification platform may pre-process the electronic messages to reduce the quantity of electronic messages that are further processed to identify the one or more electronic messages associated with the employment account of the user. For example, the verification platform may filter the electronic messages by a source of the electronic messages (e.g., domain name of the source of the electronic messages, whether the source is included on a list of sources provided by an individual associated with the electronic messaging account, and/or the like), a folder into which the electronic messages have been filtered by the server device hosting the electronic messaging account (e.g., an inbox, a promotions folder, a spam folder, and/or the like), a date on which the electronic messages were received (e.g., electronic messages older than a particular date may not be processed), and/or the like. This conserves processing resources of the verification platform by reducing a quantity of electronic messages that the verification platform may have to process, by filtering electronic messages that are unlikely to include data related to future earnings of the user, and/or the like.

Additionally, or alternatively, the verification platform may identify terms and/or phrases included in a subject line and/or in a body of the electronic messages and may discard electronic messages that include particular combinations of terms and/or phrases. Additionally, or alternatively, and as another example, the verification platform may discard duplicate electronic messages (e.g., electronic messages that have the same header, the same body, the same unique identifier, etc.).

In some implementations, the verification platform may store information associated with content of the one or more electronic messages. For example, the verification platform may store, in a data structure, information associated with content of the one or more electronic messages, such as, a copy of the one or more electronic messages, an identifier for the one or more electronic messages, information indicating the future earnings of the user, paystub information of the user, and/or the like.

In all three scenarios, after obtaining and/or determining the data related to future earnings of the user, the verification platform may perform additional steps to process the data related to future earnings of the user, determine the payment plan, and cause the bill to be paid according to the payment plan. As shown in FIG. 1D, and by reference number 134, the verification platform may process the data related to future earnings of the user to identify an earnings amount and an earnings date. In some implementations, the earnings amount may be associated with an amount owed to the user and the earnings date may be associated with a date on which the earnings amount will be available to the user. For example, the verification platform may determine the earnings amount and the earnings date based on a pay amount and a pay date identified in information concerning the user's next payday. The verification platform may consider additional factors to determine the earnings amount and the earnings date. For example, the verification platform may consider additional factors, such as taxes, garnishments, loan payments, and/or the like to determine the earnings amount. As another example, the verification platform may consider additional factors, such as the amount of time for a direct deposit to process, the amount of time for a paycheck to be deposited and clear, the availability of funds on weekends and/or holidays, and/or the like to determine the earnings date. The additional factors may be included in the data related to future earnings of the user, or the verification platform may obtain the data from the employer system server, the electronic messaging server, the banking server, and/or another device in a similar manner to that described herein.

As shown by reference number 136, the verification platform may determine the payment plan, which may indicate a payment amount and a payment date, based on the earnings amount and the earnings date. In some implementations, the verification platform may calculate the payment amount based on the due amount and the earnings amount. For example, the verification platform may compare the due amount and the earnings amount and make the payment amount equal to the lesser of the due amount and the earnings amount. If the earnings amount is less than the due amount, the verification platform may have the difference between the due amount and earnings amount added to a due amount for the next billing period. In some implementations, the verification platform may calculate the payment date based on the due date and the earnings date. For example, the verification platform may compare the due date and earnings date and make the payment date the later of the earnings date and the due date.

In some implementations, the verification platform can utilize a machine learning or artificial intelligence model to determine the payment plan. For example, based on the model, the verification platform can assign a respective weight to the due amount, the earnings amount, the due date, the earnings date, as well as other factors, such as the user's payment history, the user's credit score, the employer's payment history, and/or the like, to determine the payment plan, which may indicate the payment amount and the payment date. In this way, the verification platform can determine a payment plan that reduces late fees, minimizes indebtedness, minimizes the impact on the user's credit, and/or the like.

In some implementations, the verification platform can train the model based on an artificial intelligence approach, such as a machine learning algorithm, a neural network algorithm, or another type of artificial intelligence approach. To train the model based on the artificial intelligence approach, the verification platform can use a training set of known inputs (e.g., the due amount, the earnings amount, the due date, and the earnings date) and known outputs corresponding to the inputs (e.g., the payment amount and the payment date). For example, the verification platform can train the model based on a training set of data that includes an input group (e.g., past inputs relating to the due amount, the earnings amount, the due date, and the earnings date) and an output group (e.g., past outputs relating to the payment amount and the payment date), where each input group, such as the due amount, the earnings amount, the due date, and the earnings date, corresponds to an optimal output group, such as an optimal payment amount and an optimal payment date that reduces late fees, minimizes indebtedness, minimizes the impact on the user's credit, and/or the like. In some implementations, another device can train the model and provide the model for use by the verification platform.

In some implementations, the artificial intelligence approach can identify relationships between the known inputs and the known outputs, and can configure parameters corresponding to the relationships. For example, the model can process the training set of data and create general rules for determining the payment amount and the payment date based on the due amount, the earnings amount, the due date, and the earnings date. In some implementations, the model can be used to assign scores to payment plans based on a likelihood that the payment plans would provide an optimal payment plan for allowing the user time to pay the bill (e.g., in view of other pending bills) while ensuring that the bill is paid in a prompt manner.

In some implementations, the verification platform can update the model based on the artificial intelligence approach. For example, the verification platform can use a testing set of known inputs (e.g., inputs relating to the due amount, the earnings amount, the due date, and the earnings date) and target outputs corresponding to the known outputs (e.g., outputs relating to the payment amount and the payment date). The target outputs can be outputs that are known to be optimal. The verification platform can input, to the model, the known inputs of the testing set, and the model can output observed outputs. The verification platform can compare the target outputs and the observed outputs, and can reconfigure the parameters of the model based on the artificial intelligence algorithm. In this way, the verification platform can improve accuracy of the model based on iteratively improving accuracy of parameters of the model.

In some implementations, the verification platform can use the trained and updated model to select the payment plan. For example, the verification platform can identify the due amount, the earnings amount, the due date, and the earnings date and use the due amount, the earnings amount, the due date, and the earnings date as inputs to the model. The model can then output information identifying the payment amount and the payment date, possibly with corresponding scores for the payment amount and the payment date. In some implementations, the verification platform can select the payment amount and the payment date based on the scores.

In this way, the verification platform can deliver an optimized process for determining the payment plan in a manner that conserves computing resources (e.g., processor resources, memory resources, and/or the like), which would otherwise be wasted performing an inefficient and/or time consuming process.

As shown by reference number 138, the verification platform may cause a payment account associated with the user to pay the bill according to the payment plan. For example, the verification platform may send an instruction to a banking server to facilitate payment of the bill according to the payment plan by the payment account associated with the user. As shown by reference number 140, the banking server may facilitate payment of the bill according to the payment plan by the payment account associated with the user. For example, the banking server may run a process for the payment account to pay the bill in accordance with the payment plan.

Other examples in which the above described implementations may be applicable are possible. As one example, the data related to future earnings of the user may include information concerning selling stock, selling products, selling services, selling cryptocurrency, receiving an inheritance, receiving a settlement, receiving an award, receiving a scholarship, and/or the like, where the data related to future earnings of the user may be included in an account of the user on a server. The verification platform may be able to obtain the data related to future earnings of the user from the account of the user on the server in a similar manner to that described elsewhere herein (see, e.g., the description accompanying FIGS. 1A-1C).

As another example, in some implementations, the verification platform may obtain data related to any future deposit to an account of the user, such as data related to future payments to the user, data related to future reimbursements to the user, data related to future money transfers to the user, and/or the like, in a similar manner to the verification platform obtaining the data related to the future earnings of the user as described herein in relation to FIGS. 1A-1C. For example, the verification platform may obtain the data related to future reimbursements to the user (e.g., for expenses incurred by the user while travelling for business) from the employer system server in a similar manner as described herein in relation to FIGS. 1A and 1B. As another example, the verification platform may obtain data related to future payments to the user from the electronic message server in a similar manner as described herein in relation to FIG. 1C. As another example, the verification platform may obtain the data related to the future money transfers to the user (e.g., scheduled money transfers to the user using a peer-to-peer money transfer system) by accessing a peer-to-peer money transfer system server in similar manner to accessing the employer system server in FIGS. 1A and 1B. As another example, data related to future deposits may be determined based on data identifying scheduled or recurring deposits associated with the account of the user, and/or based on recurring patterns identified in historical account data of the account of the user.

Figure 1D:
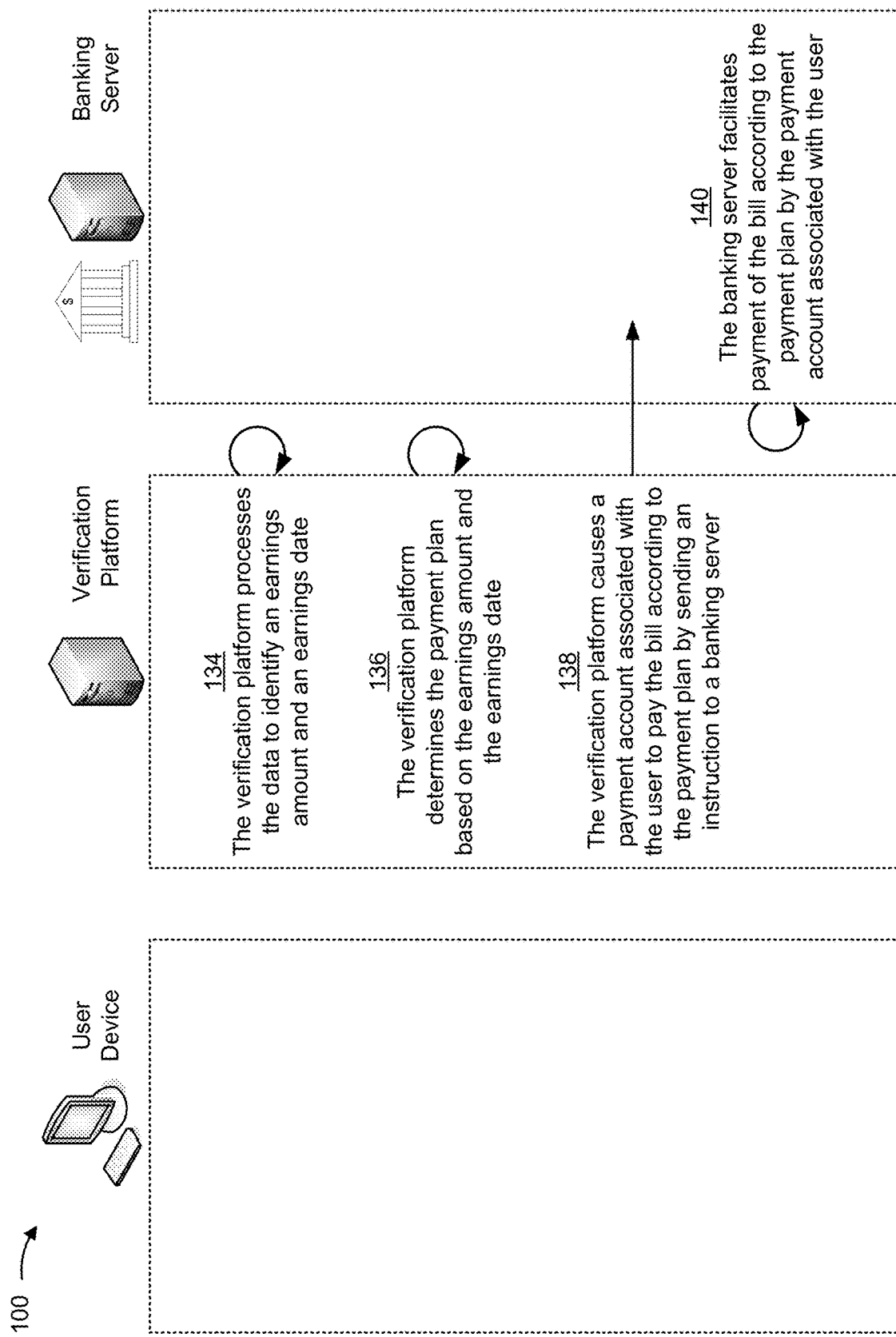

As another example, in some implementations, the verification platform may process the data related to the future earnings of the user, the data related to future payments to the user, the data related to future reimbursements to the user, the data related to future money transfers to the user, and/or the like, to determine a financial plan in a similar manner to the verification platform determining the payment plan as described herein in relation to FIG. 1D. In some implementations, the financial plan may include the payment plan, a budgeting plan, an escrow plan, a financial account synchronization plan, a savings plan, a retirement-plan deduction plan, a tax plan, a tax savings plan, and/or the like. For example, the verification platform may determine a budgeting plan, which may indicate one or more account balances to maintain on one or more dates, based on the data related to future money transfers.

In some embodiments, data related to future deposits may be viewable in a ledger associated with the account of the user. Such a ledger may enable the future deposit data to be considered as available funds for other purposes by a financial institution or other third party, such as for determining a relative asset to debt ratio, a credit score, or other financing qualifications, for example, or the like, at any particular time. This may be advantageous for enabling a financial institution or other lender, etc. to realize a more holistic or accurate understanding of an account holder's account health or cash flow that may not be understood from a snapshot of the account at any particular moment in time.

As another example, in some implementations, the verification platform may cause a lock to be placed on the payment account for the payment amount until the payment date. In some implementations, placing the lock on the user account may mean locking the user account from making any payments, from making payments once the earnings amount is received, from making payments until the payment date, from making payments that exceed the earnings amount, from making payments that would cause the balance of the account to fall below an amount equal to the payment amount on the payment date, and/or the like. For example, causing a lock to be placed on the payment account may restrict the payment account from making any payment until the payment date. On the payment date, the payment account may pay the bill for the payment amount according to the payment plan before making any additional payments. In some implementations, the payment account paying the bill for the payment amount on the payment date causes a release of the lock on the payment account, such that payment account may be free to make additional payments. In some implementations, the verification platform may cause a lock on the payment account to be placed after determining the payment plan and cause the lock on the payment account to be released after causing the payment account to pay the bill according to the payment plan.

As another example, in some implementations, the verification platform may send, to the banking server (e.g., an institution that manages the payment account) a first signal for the banking server to set a lock on the payment account, such that the payment account may make no other payment except paying the bill for the payment amount on the payment date in accordance with the payment plan. After the payment account pays the bill, the verification platform may send to the banking server a second signal for the institution to release the lock on the payment account, which allows the payment account to make additional payments.

As another example, in some implementations, the verification platform may send, to the user device, a notification indicating that the payment plan has been set up and may send, to the user device, a message asking permission to place a lock on the payment account. For example, the verification platform may send, to the user device, a notification, which indicates that the payment amount and the payment date have been established as part of the payment plan, and a message, which asks the user to place a lock on the payment account to ensure that the bill will be paid according to the payment plan. In some implementations, the verification platform may then receive, from the user device, a signal to place the lock on the payment account. For example, the user may agree to placing the lock on the user account and may send a signal indicating agreement to the verification platform. The verification platform may then cause the lock to be placed on the payment account for the payment amount until the payment date. In some implementations, causing the lock to be placed on the payment account prevents the payment account from making a debit such that the debit would cause the balance of the payment account to fall below an amount equal to the payment amount.

As another example, in some implementations, the verification platform may calculate a penalty amount based on determining the payment plan and cause the payment account, associated with the user, to be assessed the penalty amount. For example, the payment date may be outside of a threshold range of the due date and the verification platform may calculate a penalty amount based on the number of days the payment date is beyond the due date. In some implementations, the penalty amount may be a percentage of the due amount, a percentage of the payment amount, a flat fee, and/or the like. The verification platform may cause the payment account to be assessed the penalty amount in a similar manner as to that described herein with respect to causing the payment account to pay the bill according to the payment plan (see, e.g., the description accompanying FIG. 1C). In some implementations, if the payment date is within the threshold range of the due date, the penalty amount may be zero or an amount less than a penalty fee associated with paying the bill after the due date without a payment plan. In some implementations, the verification platform may calculate and assess the penalty amount if the verification platform is unable to cause the payment account to pay the bill according to the payment plan (e.g., the payment account does not have sufficient funds to pay the payment amount on the payment date).

As another example, in some implementations, the verification platform may calculate a transaction amount based on causing the payment account associated with the user to pay the bill according to the payment plan and cause the payment account associated with the user to pay the transaction amount. For example, the verification platform may charge a fee for creating the payment plan and facilitating payment of the bill. The fee may be a percentage of the due amount, a percentage of the payment amount, a flat fee, and/or the like.

As another example, in some implementations, the user may have numerous, recurring bills and may want the verification platform to set up an automatic payment plan to pay the bills on an ongoing basis. The user may send a signal, via the user device, to the verification platform to set up the automatic payment plan in a similar manner to that described herein (see, e.g., the description accompanying FIG. 1A). In some implementations, the verification platform may, on a frequent basis (e.g., hourly, daily, weekly, monthly, and/or the like), access the employer system server, the electronic messaging server, the banking server, and/or another device to obtain information concerning the finances of the user and/or information concerning the bills in a similar manner to that described herein (see, e.g., the description accompanying FIGS. 1A-1C). In some implementations, the information concerning the finances of the user may include the data related to future earnings of the user, data related to historical earnings of the user, data related to debits and/or payments of the user, data related to credits and/or deposits of the user, and/or the like. In some implementations, the information concerning the bills may include information identifying each bill, information identifying a due amount and a due date for each bill, information identifying the issuer of each bill, and/or the like. In some implementations, the verification platform may automatically analyze the information concerning the finances of the user and the information concerning the bills to determine automatic payment plans that provide the greatest benefit to the user, such as, minimizing the amount of late fees, prioritizing essential services' bills for payment first, prioritizing bills for payment to minimize the impact on the user's credit score, and/or the like. The verification platform may determine the automatic payment plans on an ongoing basis and cause the payment account associated with the user to pay the bills according to the automatic payment plans. In this way, the verification platform can provide a bills paying service that requires minimal input and/or oversight by the user.

In some implementations, the verification platform, based on the information concerning the finances of the user and the information concerning the bills, may use a machine learning or artificial intelligence model to determine the automatic payment plans in a similar manner to that described herein (see, e.g., the description accompanying FIG. 1D). The verification platform can train and update the model using training sets of known inputs (e.g., sets of information concerning the finances of multiple users and information concerning the bills of multiple users) and sets of known outputs (e.g., sets of optimal automatic payment plans). In some implementations, the verification platform can use the trained and updated model to select the automatic payment plans.

In this way, the verification platform can assist with setting up a payment plan for paying a bill that does not require cumbersome human interaction to determine the parameters of the payment plan. This conserves processing resources and/or computing resources that would otherwise be consumed when an individual inefficiently searches for and/or enters future earnings information into a device to determine the payment plan. In addition, the verification platform can create payment plans related to hundreds, thousands, or more bills of numerous users in a centralized, organized, and easily accessible manner. This increases the use of payment plans by users, thereby decreasing the amount of delinquent bills, which results in less monetary penalties to the users and more consistent revenue for bill collectors.

As indicated above, FIGS. 1A-1D are provided merely as examples. Other examples are possible and may differ from what was described with regard to FIGS. 1A-1D.

Figure 2:
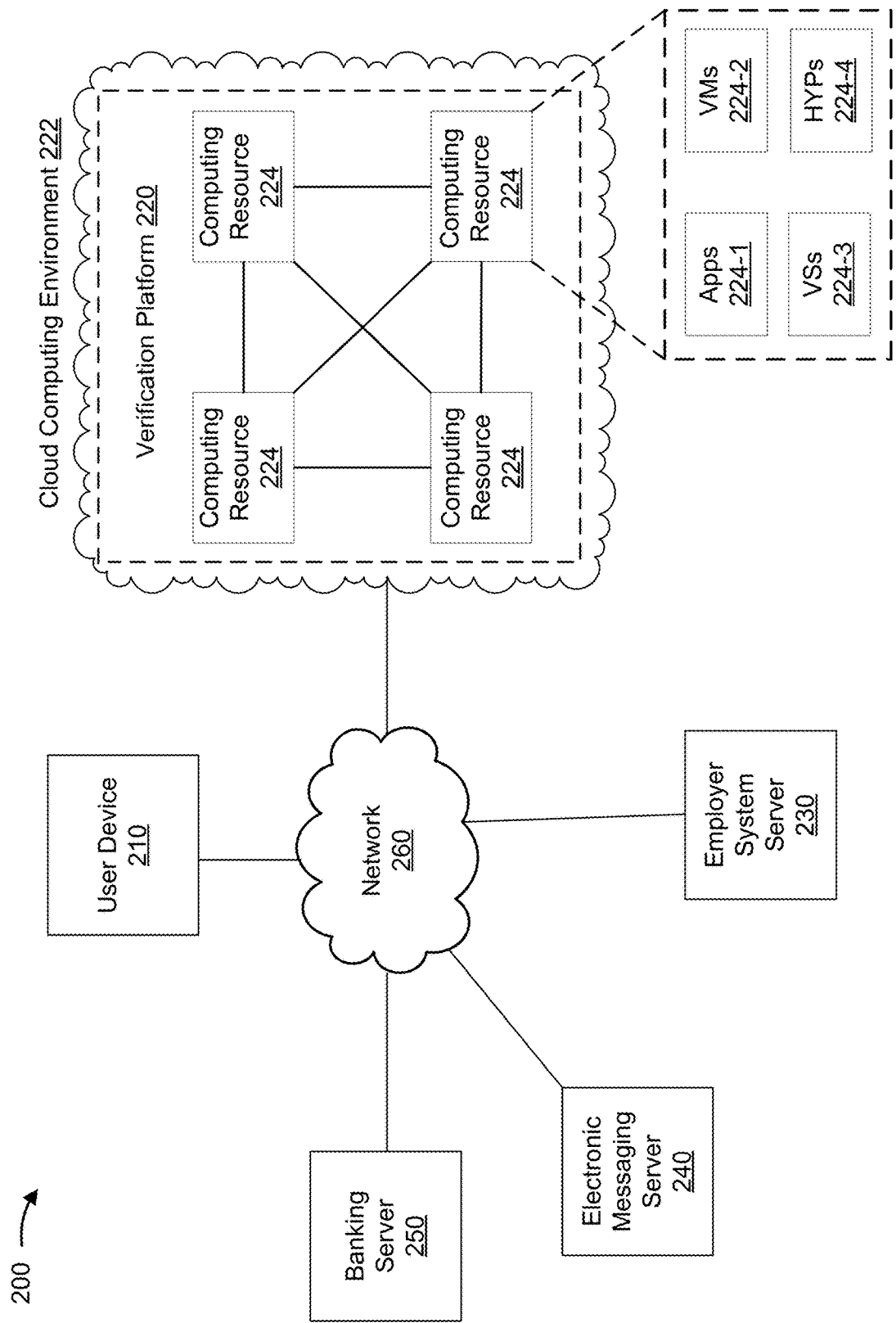
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a verification platform 220, a cloud computing environment 222, a computing resource 224, an employer system server 230, an electronic messaging server 240, a banking server 250, and a network 260. Devices of environment 200 may interconnect via wired connections, wireless connections, or a combination of wired and wireless connections.

User device 210 includes one or more devices capable of receiving, generating, storing, processing, and/or providing information associated with setting up a payment plan to pay a bill. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Verification platform 220 includes one or more devices capable of receiving, generating, storing, processing, and/or providing information associated with setting up a payment plan to pay a bill. For example, verification platform 220 may include a cloud server or a group of cloud servers. In some implementations, verification platform 220 may be designed to be modular such that certain software components can be swapped in or out depending on a particular need. As such, verification platform 220 may be easily and/or quickly reconfigured for different uses.

In some implementations, as shown, verification platform 220 may be hosted in cloud computing environment 222. Notably, while implementations described herein describe verification platform 220 as being hosted in cloud computing environment 222, in some implementations, verification platform 220 may not be cloud-based (i.e., may be implemented outside of a cloud computing environment) or may be partially cloud-based.

Cloud computing environment 222 includes an environment that delivers computing as a service, whereby shared resources, services, etc. may be provided to determine a payment plan and cause a payment account to pay a bill according to the payment plan. Cloud computing environment 222 may provide computation, software, data access, storage, and/or other services that do not require end-user knowledge of a physical location and configuration of a system and/or a device that delivers the services. As shown, cloud computing environment 222 may include verification platform 220 and computing resource 224.

Computing resource 224 includes one or more personal computers, workstation computers, server devices, or another type of computation and/or communication device. In some implementations, computing resource 224 may host verification platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 may include a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by one or more devices of example environment 200. Application 224-1 may eliminate a need to install and execute the software applications on devices of example environment 200. For example, application 224-1 may include software associated with verification platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Employer system server 230 includes one or more devices capable of receiving, generating, storing, processing, and/or providing information related to an employment account. For example, employer system server 230 may include a server (e.g., in a data center or a cloud computing environment), a data center (e.g., a multi-server micro data center), a workstation computer, a virtual machine (VM) provided in a cloud computing environment, or a similar type of device. In some implementations, employer system server 230 may be a physical device implemented within a housing, such as a chassis. In some implementations, employer system server 230 may be a virtual device implemented by one or more computer devices of a cloud computing environment or a data center. In some implementations, employer system server 230 may host an employment account, as described elsewhere herein. Additionally, or alternatively, employer system server 230 may allow verification platform 220 to process information about a user in the employment account stored by employer system server 230 (e.g., based on employer system server 230 and/or user device 210 providing access information related to the employment account), as described elsewhere herein.

Electronic messaging server 240 includes one or more devices capable of receiving, generating, storing, processing, and/or providing information related to an electronic message. For example, electronic messaging server 240 may include a server (e.g., in a data center or a cloud computing environment), a data center (e.g., a multi-server micro data center), a workstation computer, a virtual machine (VM) provided in a cloud computing environment, or a similar type of device. In some implementations, electronic messaging server 240 may be a physical device implemented within a housing, such as a chassis. In some implementations, electronic messaging server 240 may be a virtual device implemented by one or more computer devices of a cloud computing environment or a data center. In some implementations, electronic messaging server 240 may host an electronic messaging account, as described elsewhere herein. Additionally, or alternatively, electronic messaging server 240 may allow verification platform 220 to process electronic messages stored by electronic messaging server 240 (e.g., based on electronic messaging server 240 providing access information related to the electronic messaging account), as described elsewhere herein.

Banking server 250 includes one or more devices capable of receiving, generating, storing, processing, and/or providing information related to a payment account. For example, banking server 250 may include a server (e.g., in a data center or a cloud computing environment), a data center (e.g., a multi-server micro data center), a workstation computer, a virtual machine (VM) provided in a cloud computing environment, or a similar type of device. In some implementations, banking server 250 may be a physical device implemented within a housing, such as a chassis. In some implementations, banking server 250 may be a virtual device implemented by one or more computer devices of a cloud computing environment or a data center. In some implementations, banking server 250 may host a payment account, as described elsewhere herein. Additionally, or alternatively, banking server 250 may allow verification platform 220 to cause the payment account to perform an action, as described elsewhere herein.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
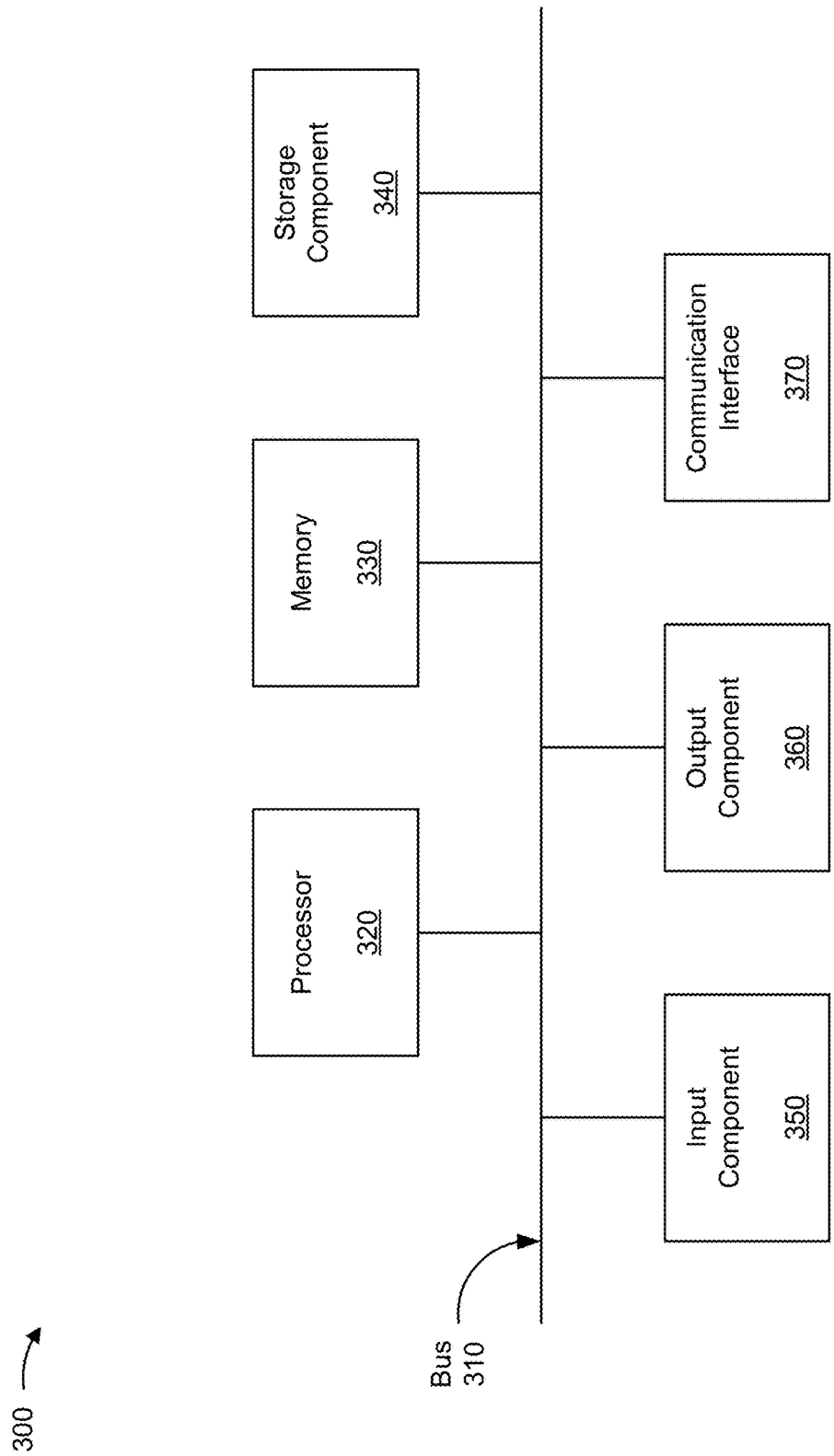
FIG. 3 is a diagram of example components of one or more devices of FIG. 2.

FIG. 3 is a diagram of example components of a device 300. Device 300 may correspond to user device 210, verification platform 220, computing resource 224, employer system server 230, electronic messaging server 240, and/or banking server 250. In some implementations, user device 210, verification platform 220, computing resource 224, employer system server 230, electronic messaging server 240, and/or banking server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
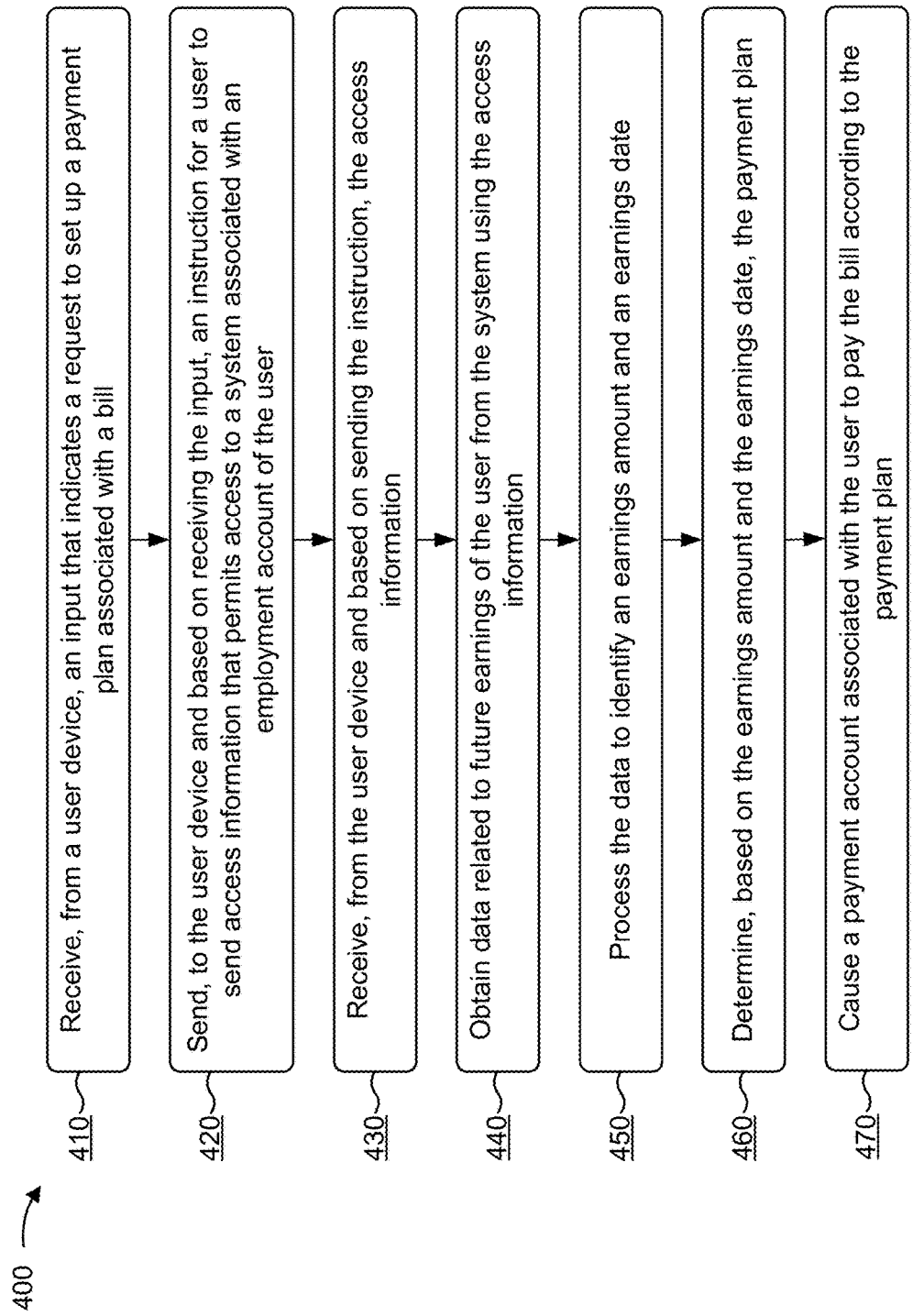
FIG. 4 is a flow chart of an example process for setting up a payment plan to pay a bill.

FIG. 4 is a flow chart of an example process 400 for setting up a payment plan to pay a bill. In some implementations, one or more process blocks of FIG. 4 may be performed by a verification platform (e.g., verification platform 220). In some implementations, one or more process blocks of FIG. 4 may be performed by another device or a group of devices separate from or including the verification platform (e.g., verification platform 220), such as a user device (e.g., user device 210), a computing resource (e.g., computing resource 224), an employer system server (e.g., employer system server 230), an electronic messaging server (e.g., electronic messaging server 240), and a banking server (e.g., banking server 250).

As shown in FIG. 4, process 400 may include receiving, from a user device, an input that indicates a request to set up a payment plan associated with a bill (block 410). For example, the verification platform (e.g., using computing resource 224, processor 320, memory 330, storage component 340, input component 350, communication interface 370, and/or the like) may receive, from a user device, an input that indicates a request to set up a payment plan associated with a bill, as described above in connection with FIGS. 1A-1D.

As further shown in FIG. 4, process 400 may include sending, to the user device and based on receiving the input, an instruction for a user to send access information that permits access to a system associated with an employment account of the user (block 420). For example, the verification platform (e.g., using computing resource 224, processor 320, memory 330, storage component 340, output component 360, communication interface 370, and/or the like) may send, to the user device and based on receiving the input, an instruction for a user to send access information that permits access to a system associated with an employment account of the user, as described above in connection with FIGS. 1A-1D.

As further shown in FIG. 4, process 400 may include receiving, from the user device and based on sending the instruction, the access information (block 430). For example, the verification platform (e.g., using computing resource 224, processor 320, memory 330, storage component 340, input component 350, communication interface 370, and/or the like) may receive, from the user device and based on sending the instruction, the access information, as described above in connection with FIGS. 1A-1D.

As further shown in FIG. 4, process 400 may include obtaining data related to future earnings of the user from the system using the access information (block 440). For example, the verification platform (e.g., using computing resource 224, processor 320, memory 330, storage component 340, input component 350, output component 360, communication interface 370, and/or the like) may obtain data related to future earnings of the user from the system using the access information, as described above in connection with FIGS. 1A-1D.

As further shown in FIG. 4, process 400 may include processing the data to identify an earnings amount and an earnings date (block 450). For example, the verification platform (e.g., using computing resource 224, processor 320, memory 330, storage component 340, and/or the like) may process the data to identify an earnings amount and an earnings date, as described above in connection with FIGS. 1A-1D. In some implementations, the earnings amount may be associated with an amount owed to the user and the earnings date may be associated with a date on which the earnings amount will be available to the user.

As further shown in FIG. 4, process 400 may include determining, based on the earnings amount and the earnings date, the payment plan (block 460). For example, the verification platform (e.g., using computing resource 224, processor 320, memory 330, storage component 340, and/or the like) may determine, based on the earnings amount and the earnings date, the payment plan, as described above in connection with FIGS. 1A-1D. In some implementations, the payment plan may indicate a payment amount and a payment date.

As further shown in FIG. 4, process 400 may include causing a payment account associated with the user to pay the bill according to the payment plan (block 470). For example, the verification platform (e.g., using computing resource 224, processor 320, memory 330, storage component 340, input component 350, output component 360, communication interface 370, and/or the like) may cause a payment account associated with the user to pay the bill according to the payment plan.

Process 400 may include additional implementations, such as any single implementation or any combination of implementations described below and/or in connection with one or more other processes described elsewhere herein.

In some implementations, when obtaining the data related to future earnings of the user from the system using the access information, the verification platform may access the system using the access information, navigate to where the data is stored in the system, and obtain the data from the system. In some implementations, the verification platform may calculate a penalty amount based on determining the payment plan, and cause the payment account, associated with the user, to be assessed the penalty amount. In some implementations, the verification platform may cause a lock to be placed on the payment account for the payment amount until the payment date.

In some implementations, the verification platform may send, to the user device, a notification indicating that the payment plan has been set up, may send, to the user device, a message asking permission to place a lock on the payment account, may receive, from the user device, a signal to place the lock on the payment account, and may cause the lock to be placed on the payment account for the payment amount until the payment date. In some implementations, the bill may indicate a due amount and a due date. In some implementations, when determining, based on the earnings amount and the earnings date, the payment plan, the verification platform may calculate the payment amount based on the due amount and the earnings amount, and calculate the payment date based on the due date and the earnings date.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
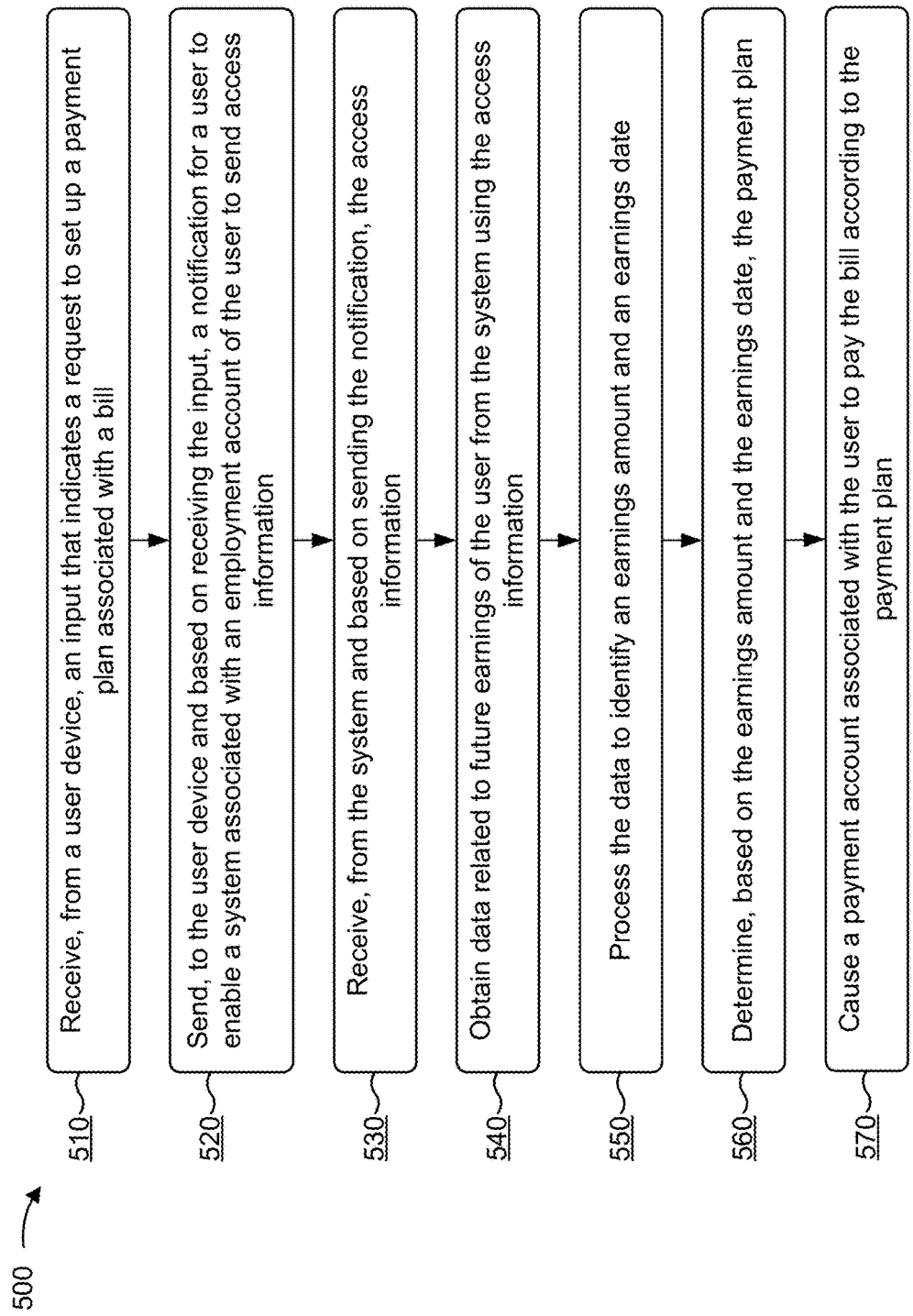
FIG. 5 is a flow chart of an example process for setting up a payment plan to pay a bill.

FIG. 5 is a flow chart of an example process 500 for setting up a payment plan to pay a bill. In some implementations, one or more process blocks of FIG. 5 may be performed by a verification platform (e.g., verification platform 220). In some implementations, one or more process blocks of FIG. 5 may be performed by another device or a group of devices separate from or including the verification platform (e.g., verification platform 220), such as a user device (e.g., user device 210), a computing resource (e.g., computing resource 224), an employer system server (e.g., employer system server 230), an electronic messaging server (e.g., electronic messaging server 240), and a banking server (e.g., banking server 250).

As shown in FIG. 5, process 500 may include receiving, from a user device, an input that indicates a request to set up a payment plan associated with a bill (block 510). For example, the verification platform (e.g., using computing resource 224, processor 320, memory 330, storage component 340, input component 350, communication interface 370, and/or the like) may receive, from a user device, an input that indicates a request to set up a payment plan associated with a bill, as described above in connection with FIGS. 1A-1D.

As further shown in FIG. 5, process 500 may include sending, to the user device and based on receiving the input, a notification for a user to enable a system associated with an employment account of the user to send access information (block 520). For example, the verification platform (e.g., using computing resource 224, processor 320, memory 330, storage component 340, output component 360, communication interface 370, and/or the like) may send, to the user device and based on receiving the input, a notification for a user to enable a system associated with an employment account of the user to send access information, as described above in connection with FIGS. 1A-1D.

As further shown in FIG. 5, process 500 may include receiving, from the system and based on sending the notification, the access information (block 530). For example, the verification platform (e.g., using computing resource 224, processor 320, memory 330, storage component 340, input component 350, communication interface 370, and/or the like) may receive, from the system and based on sending the notification, the access information, as described above in connection with FIGS. 1A-1D.

As further shown in FIG. 5, process 500 may include obtaining data related to future earnings of the user from the system using the access information (block 540). For example, the verification platform (e.g., using computing resource 224, processor 320, memory 330, storage component 340, input component 350, output component 360, communication interface 370, and/or the like) may obtain data related to future earnings of the user from the system using the access information, as described above in connection with FIGS. 1A-1D.

As further shown in FIG. 5, process 500 may include processing the data to identify an earnings amount and an earnings date (block 550). For example, the verification platform (e.g., using computing resource 224, processor 320, memory 330, storage component 340, input component 350, communication interface 370, and/or the like) may process the data to identify an earnings amount and an earnings date, as described above in connection with FIGS. 1A-1D. In some implementations, the earnings amount may be associated with an amount owed to the user and the earnings date may be associated with a date on which the earnings amount will be available to the user.

As further shown in FIG. 5, process 500 may include determining, based on the earnings amount and the earnings date, the payment plan (block 560). For example, the verification platform (e.g., using computing resource 224, processor 320, memory 330, storage component 340, and/or the like) may determine, based on the earnings amount and the earnings date, the payment plan, as described above in connection with FIGS. 1A-1D. In some implementations, the payment plan may indicate a payment amount and a payment date.

As further shown in FIG. 5, process 500 may include causing a payment account associated with the user to pay the bill according to the payment plan (block 570). For example, the verification platform (e.g., using computing resource 224, processor 320, memory 330, storage component 340, input component 350, output component 360, communication interface 370, and/or the like) may cause a payment account associated with the user to pay the bill according to the payment plan.

Process 500 may include additional implementations, such as any single implementation or any combination of implementations described below and/or in connection with one or more other processes described elsewhere herein.

In some implementations, the access information may be a security token. In some implementations, when obtaining the data related to future earnings of the user from the system using the access information, the verification platform may access the system using the access information, may send a query to the system for the data, and may receive the data from the system. In some implementations, when obtaining the data related to future earnings of the user from the system using the access information, the verification platform may establish a connection with the system via an application programming interface (API), may request, via the connection, delivery of the data from the system, and may receive, via the connection, the data from the system.

In some implementations, the verification platform may calculate a transaction amount based on causing the payment account associated with the user to pay the bill according to the payment plan, and may cause the payment account associated with the user to pay the transaction amount. In some implementations, when causing the payment account associated with the user to pay the bill according to the payment plan, the verification platform may send, to an institution that manages the payment account, a first signal for the institution to set a lock on the payment account, and may send, to the institution on the payment date, a message that causes the payment account associated with the user to pay the bill according to the payment plan. In some implementations, the verification platform may send, to the institution after causing the payment account associated with the user to pay the bill according to the payment plan, a second signal for the institution to release the lock on the payment account.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
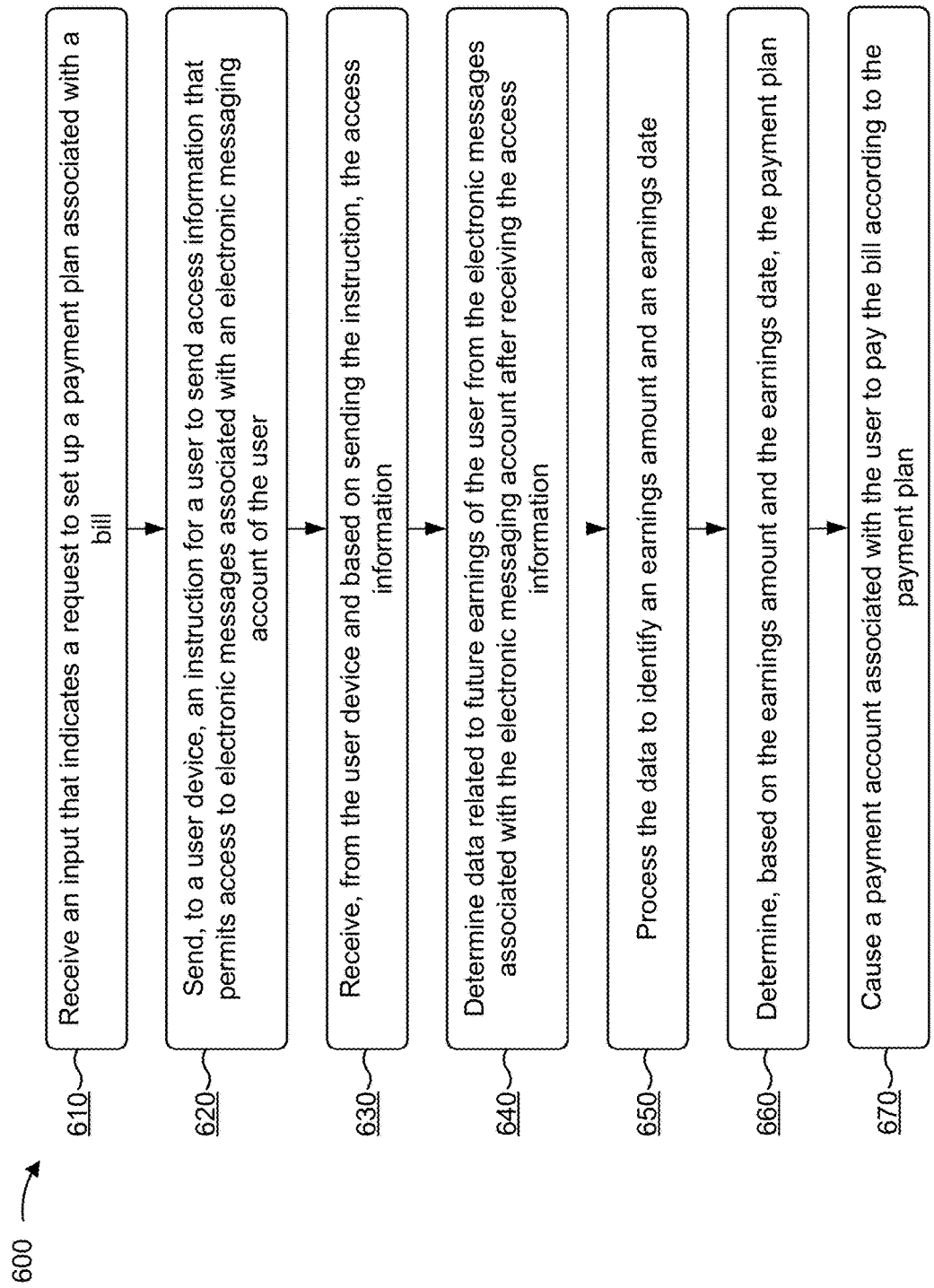
FIG. 6 is a flow chart of an example process for setting up a payment plan to pay a bill.

FIG. 6 is a flow chart of an example process 600 for setting up a payment plan to pay a bill. In some implementations, one or more process blocks of FIG. 6 may be performed by a verification platform (e.g., verification platform 220). In some implementations, one or more process blocks of FIG. 6 may be performed by another device or a group of devices separate from or including the verification platform (e.g., verification platform 220), such as a user device (e.g., user device 210), a computing resource (e.g., computing resource 224), an employer system server (e.g., employer system server 230), an electronic messaging server (e.g., electronic messaging server 240), and a banking server (e.g., banking server 250).

As shown in FIG. 6, process 600 may include receiving an input that indicates a request to set up a payment plan associated with a bill (block 610). For example, the verification platform (e.g., using computing resource 224, processor 320, memory 330, storage component 340, input component 350, communication interface 370, and/or the like) may receive an input that indicates a request to set up a payment plan associated with a bill, as described above in connection with FIGS. 1A-1D.

As further shown in FIG. 6, process 600 may include sending, to a user device, an instruction for a user to send access information that permits access to electronic messages associated with an electronic messaging account of the user (block 620). For example, the verification platform (e.g., using computing resource 224, processor 320, memory 330, storage component 340, output component 360, communication interface 370, and/or the like) may send, to a user device, an instruction for a user to send access information that permits access to electronic messages associated with an electronic messaging account of the user, as described above in connection with FIGS. 1A-1D.

As further shown in FIG. 6, process 600 may include receiving, from the user device and based on sending the instruction, the access information (block 630). For example, the verification platform (e.g., using computing resource 224, processor 320, memory 330, storage component 340, input component 350, communication interface 370, and/or the like) may receive, from the user device and based on sending the instruction, the access information, as described above in connection with FIGS. 1A-1D.

As further shown in FIG. 6, process 600 may include determining data related to future earnings of the user from the electronic messages associated with the electronic messaging account after receiving the access information (block 640). For example, the verification platform (e.g., using computing resource 224, processor 320, memory 330, storage component 340, and/or the like) may determine data related to future earnings of the user from the electronic messages associated with the electronic messaging account after receiving the access information, as described above in connection with FIGS. 1A-1D.

As further shown in FIG. 6, process 600 may include processing the data to identify an earnings amount and an earnings date (block 650). For example, the verification platform (e.g., using computing resource 224, processor 320, memory 330, storage component 340, and/or the like) may process the data to identify an earnings amount and an earnings date, as described above in connection with FIGS. 1A-1D. In some implementations, the earnings amount may be associated with an amount owed to the user and the earnings date may be associated with a date on which the earnings amount will be available to the user.

As further shown in FIG. 6, process 600 may include determining, based on the earnings amount and the earnings date, the payment plan (block 660). For example, the verification platform (e.g., using computing resource 224, processor 320, memory 330, storage component 340, and/or the like) may determine, based on the earnings amount and the earnings date, the payment plan, as described above in connection with FIGS. 1A-1D. In some implementations, the payment plan may indicate a payment amount and a payment date.

As further shown in FIG. 6, process 600 may include causing a payment account associated with the user to pay the bill according to the payment plan (block 670). For example, the verification platform (e.g., using computing resource 224, processor 320, memory 330, storage component 340, input component 350, output component 360, communication interface 370, and/or the like) may cause a payment account associated with the user to pay the bill according to the payment plan.

Process 600 may include additional implementations, such as any single implementation or any combination of implementations described below and/or in connection with one or more other processes described elsewhere herein.

In some implementations, when determining the data related to future earnings of the user from the electronic messages associated with the electronic messaging account after receiving the access information, the verification platform may access the electronic messaging account using the access information, may process the electronic messages associated with the electronic messaging account to identify one or more electronic messages associated with an employment account of the user, and may store information associated with content of the one or more electronic messages. In some implementations, the information associated with content of the one or more electronic messages may indicate future earnings of the user. In some implementations, the information associated with content of the one or more electronic messages may include paystub information of the user.

In some implementations, when determining the data related to future earnings of the user from the electronic messages after receiving the access information, the verification platform may access the electronic messaging account using the access information, may process the electronic messages associated with the electronic messaging account to identify one or more electronic messages associated with a plurality of employment accounts of the user, and may store information associated with content of the one or more electronic messages. In some implementations, the verification platform may cause a lock on the payment account to be placed after determining the payment plan, and may cause the lock on the payment account to be released after causing the payment account to pay the bill according to the payment plan.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, verification platform 220 can assist with setting up a payment plan for paying a bill that does not require cumbersome human interaction to determine the parameters of the payment plan. This conserves processing resources and/or computing resources that would otherwise be consumed when an individual inefficiently searches for and/or enters future earnings information into a device to determine the payment plan. In addition, verification platform 220 can create payment plans related to hundreds, thousands, or more bills of numerous users in a centralized, organized, and easily accessible manner. This increases the use of payment plans by users, thereby decreasing the amount of delinquent bills, which results in less monetary penalties to the users and more consistent revenue for bill collectors.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a first device and from a second device, electronic messaging account access information that enables access to a system associated with an electronic messaging account of a user;
accessing, by the first device, the system using the electronic messaging account access information;
pre-processing, by the first device, based on accessing the system, and using one or more filtering criteria, electronic messages of the electronic messaging account to identify a set of electronic messages,
wherein pre-processing the electronic messages is based on one or more of:
a domain name of a source of the electronic messages,
a folder filtered by a server device hosting the electronic messaging account, or
a date associated with when the electronic messages were received;
processing, by the first device and after pre-processing the electronic messages, the set of electronic messages to identify an electronic message that indicates future earnings of the user;
processing, by the first device, the electronic message to identify an earnings amount and an earnings date,
the earnings amount being associated with an amount owed to the user, and
the earnings date being associated with a date on which the earnings amount will be available to the user;
determining, by the first device and based on the earnings amount and the earnings date, a payment plan associated with a bill,
the payment plan indicating a payment amount and a payment date; and
performing, by the first device, an action based on the payment plan,
wherein the action is associated with facilitating payment of the bill based on the payment plan.

2. The method of claim 1, wherein performing the action further comprises:
causing a payment account associated with the user to pay the bill according to the payment plan.

3. The method of claim 1, wherein performing the action further comprises:
providing a banking server with a first signal that causes the banking server to place a lock on a payment account associated with the user;
receiving data indicating that the payment account was used to pay the bill; and
providing the banking server with a second signal that causes the banking server to release the lock on the payment account.

4. The method of claim 1, wherein the second device is an employment device associated with the system.

5. The method of claim 1, wherein the second device is a user device associated with the user.

6. The method of claim 1, further comprising:
obtaining employment account access information from a user device associated with the user;
obtaining, from an employment account server and based on the employment account access information, second data related to second future earnings of the user; and
wherein determining the payment plan comprises:
determining the payment plan further based on the second data.

7. The method of claim 6, further comprising:
processing first employment data associated with the employment account access information to identify second employment data associated with the second data; and
wherein obtaining the second data comprises:
obtaining the second data from the second employment data.

8. A first device, comprising:
one or more memories; and
one or more processors communicatively coupled to the one or more memories, configured to:
receive, from a second device, electronic messaging account access information that enables access to a system associated with an electronic messaging account of a user;
access the system using the electronic messaging account access information;
pre-process, based on accessing the system and using one or more filtering criteria, electronic messages of the electronic messaging account to identify a set of electronic messages,
wherein the one or more processors, when pre-processing the electronic messages, are configured to pre-process the electronic messages based on one or more of:
a domain name of a source of the electronic messages,
a folder filtered by a server device hosting the electronic messaging account, or
a date associated with when the electronic messages were received;
process, after pre-processing the electronic messages, the set of electronic messages to identify an electronic message that indicates future earnings of the user;
process the electronic message to identify an earnings amount and an earnings date,
the earnings amount being associated with an amount owed to the user, and
the earnings date being associated with a date on which the earnings amount will be available to the user;
determine, based on the earnings amount and the earnings date, a payment plan associated with a bill,
the payment plan indicating a payment amount and a payment date; and
perform an action based on the payment plan,
wherein the action is associated with facilitating payment of the bill based on the payment plan.

9. The first device of claim 8, wherein the one or more processors, when performing the action, are further configured to:
cause a payment account associated with the user to pay the bill according to the payment plan.

10. The first device of claim 8, wherein the one or more processors, when performing the action, are further configured to:
provide a banking server with a first signal that causes the banking server to place a lock on a payment account associated with the user;
receive data indicating that the payment account was used to pay the bill; and provide the banking server with a second signal that causes the banking server to release the lock on the payment account.

11. The first device of claim 8, wherein the second device is an employment device associated with the system.

12. The first device of claim 8, wherein the second device is a user device associated with the user.

13. The first device of claim 8, wherein the one or more processors are further configured to:
　obtain employment account access information from a user device associated with the user;
　obtain, from an employment account server and based on the employment account access information, second data related to second future earnings of the user; and
　wherein the one or more processors, when determining the payment plan, are configured to:
　　determine the payment plan further based on the second data.

14. The first device of claim 13, wherein the one or more processors are further configured to:
　process first employment data associated with the employment account access information to identify second employment data associated with the second data; and
　wherein the one or more processors, when obtaining the second data, are configured to:
　　obtain the second data from the second employment data.

15. A non-transitory computer-readable medium storing instructions, the instructions comprising:
　one or more instructions that, when executed by one or more processors, cause the one or more processors to:
　　receive, from a second device, electronic messaging account access information that enables access to a system associated with an electronic messaging account of a user;
　　access the system using the electronic messaging account access information;
　　pre-process, based on accessing the system and using one or more filtering criteria, electronic messages of the electronic messaging account to identify a set of electronic messages,
　　　wherein the one or more instructions, that cause the one or more processors to pre-process the electronic messages, cause the one or more processors to pre-process the electronic messages based on one or more of:
　　　　a domain name of a source of the electronic messages,
　　　　a folder filtered by a server device hosting the electronic messaging account, or
　　　　a date associated with when the electronic messages were received;
　　process, after pre-processing the electronic messages, the set of electronic messages to identify an electronic message that indicates future earnings of the user;
　　process the electronic message to identify an earnings amount and an earnings date,
　　　the earnings amount being associated with an amount owed to the user, and
　　　the earnings date being associated with a date on which the earnings amount will be available to the user;
　　determine, based on the earnings amount and the earnings date, a payment plan associated with a bill,
　　　the payment plan indicating a payment amount and a payment date; and
　　perform an action based on the payment plan,
　　　wherein the action is associated with facilitating payment of the bill based on the payment plan.

16. The non-transitory computer-readable medium of claim 15, wherein the one or more instructions, that cause the one or more processors to perform the action further, cause the one or more processors to:
　cause a payment account associated with the user to pay the bill according to the payment plan.

17. The non-transitory computer-readable medium of claim 15, wherein the one or more instructions, that cause the one or more processors to perform the action further, cause the one or more processors to:
　provide a banking server with a first signal that causes the banking server to place a lock on a payment account associated with the user;
　receive data indicating that the payment account was used to pay the bill; and
　provide the banking server with a second signal that causes the banking server to release the lock on the payment account.

18. The non-transitory computer-readable medium of claim 15, wherein the second device is an employment device associated with the system.

19. The non-transitory computer-readable medium of claim 15, wherein the second device is a user device associated with the user.

20. The non-transitory computer-readable medium of claim 15, wherein the one or more instructions, when executed by the one or more processors, further cause the one or more processors to:
　obtain employment account access information from a user device associated with the user;
　obtain, from an employment account server and based on the employment account access information, second data related to second future earnings of the user; and
　wherein the one or more instructions, that cause the one or more processors to determine the payment plan, cause the one or more processors to:
　　determine the payment plan further based on the second data.

\* \* \* \* \*